(12) United States Patent
Seki

(10) Patent No.: US 6,559,847 B1
(45) Date of Patent: May 6, 2003

(54) IMAGE PROCESSING APPARATUS, RECORDING MEDIUM, AND PROGRAM

(75) Inventor: Takuya Seki, Tokyo (JP)

(73) Assignee: Sony Computer Entertainment Inc. (JP)

( * ) Notice: Subject to any disclaimer, the term of this patent is extended or adjusted under 35 U.S.C. 154(b) by 270 days.

(21) Appl. No.: 09/663,466

(22) Filed: Sep. 15, 2000

(30) Foreign Application Priority Data

Sep. 16, 1999 (JP) ............................................ 11-262654

(51) Int. Cl.[7] ............................................... G06T 15/00
(52) U.S. Cl. ...................................................... 345/473
(58) Field of Search ................................ 345/419, 420, 345/619, 620, 629, 473, 474, 475

(56) References Cited

U.S. PATENT DOCUMENTS

| | | | |
|---|---|---|---|
| 5,282,262 A | 1/1994 | Kurashige | 395/126 |
| 5,592,599 A | 1/1997 | Lindholm | 395/127 |
| 6,104,409 A * | 8/2000 | Watanabe et al. | 345/583 |
| 6,259,458 B1 * | 7/2001 | Theisen et al. | 345/440 |
| 6,492,989 B1 * | 12/2002 | Wilkinson | 345/440 |

FOREIGN PATENT DOCUMENTS

| | | |
|---|---|---|
| EP | 0 483 771 A2 | 5/1992 |
| EP | 0 505 142 B1 | 10/1996 |
| JP | 05108262 A | 4/1993 |
| JP | 7-6234 A | 1/1995 |

OTHER PUBLICATIONS

Takahashi, J–Y et al., "Image Synthesis of Flickering Scenes Including Simulated Flames," Nov. 1, 1997, IEICE Transactions on Information and Systems, JP, Institute of Electronics Information and Comm. Eng. Tokyo, vol. E80–D, No. 11, pp. 1102–1107.

* cited by examiner

*Primary Examiner*—Phu K. Nguyen
(74) *Attorney, Agent, or Firm*—Lerner, David, Littenberg, Krumholz & Mentlik, LLP

(57) ABSTRACT

A light sphere and a flare appearing thereasound are easily and realistically displayed on a display screen. A plurality of disks, each comprising a substantially circular central portion which is brighter and a substantially ring-shaped portion disposed around the substantially circular central portion and having a brightness lower than the substantially circular central portion, are placed at different angles in a three-dimensional space, and rotated at different speeds about the centers thereof at an origin.

27 Claims, 13 Drawing Sheets

IMAGE PROCESSING APPARATUS, RECORDING MEDIUM, AND PROGRAM

BACKGROUND OF THE INVENTION

1. Field of the Invention

The present invention relates to an image processing apparatus for use as a CG (Computer Graphics) processing apparatus for rotating and moving an object in a three-dimensional coordinate space on the display screen of a display monitor in order to express, easily and realistically, a light sphere and bright light appearing therearound easily and realistically, a recording medium storing a program for such an image processing process, and such a program.

2. Description of the Related Art is Conventional CG processing apparatus have failed to express, easily and realistically, a light sphere and bright light (flare) that appears around the light sphere.

SUMMARY OF THE INVENTION

It is therefore an object of the present invention to provide an image processing apparatus for performing an image processing process of expressing, easily and realistically, a light sphere and bright light (flare) that appears around the light sphere, a recording medium storing a program for such an image processing process, and such a program.

According to an aspect of the present invention, there is provided an image processing apparatus comprising plural disk generating means for generating a plurality of disks, each comprising a substantially circular central portion and a substantially ring-shaped portion disposed around the substantially circular central portion and having a brightness lower than the substantially circular central portion, at different angles in a three-dimensional space with respective centers thereof disposed closely to each other, rotation imparting means for imparting rotation to the disks to rotate about the centers thereof at an origin, and rendering means for rendering and storing the disks which are rotated in storing means.

Since the disks whose brightness is lower in the substantially ring-shaped portion than in the substantially circular central portion and which are rotated are rendered, the substantially circular central portion appears as a light sphere with light appearing therearound, and the brightness of the light can easily and realistically be expressed. The disks may be rotated at the same speed, but should preferably be rotated at different speeds. The centers of the disks may be aligned with each other.

A fluctuation imparting means may impart fluctuation to the disks whose brightness is lower in the substantially ring-shaped portion than in the substantially circular central portion and which are rotated, so that an image of the light sphere which emits bright light can be fluctuated. The fluctuation imparted to the disks may be a circular motion, an elliptical motion, or the like.

The rendering means may comprise means for adding a rendered image of a new frame and a rendered image of a preceding image semitransparently and rendering and storing a sum image as a rendered image of a present frame in the storing means. In this manner, the boundaries of the disks may be blurred.

The rendering means may comprise means for placing a polygon onto which a texture of a lens flare is mapped between a viewpoint and the disks, and rendering and storing the polygon and the disks in the storing means. The bright light from the light sphere may thus be displayed more realistically.

The plural disk generating means may comprise means for generating each of the disks by mapping a single texture image onto an object or combining a plurality of triangular polygons as the substantially circular central portion and a plurality of triangular polygons as the substantially ring-shaped portion.

The substantially circular central portion of each of the disks has a brightness gradually lower from the center radially outwardly toward the substantially ring-shaped portion, and the substantially ring-shaped portion has a brightness gradually lower from an inner peripheral edge thereof toward an outer peripheral edge thereof. Therefore, the light sphere and the bright light therefrom may be displayed more realistically.

According to another aspect of the present invention, there are provided a recording medium which stores a program, and a program itself. The program comprises the steps of generating a plurality of disks, each comprising a substantially circular central portion and a substantially ring-shaped portion disposed around the substantially circular central portion and having a brightness lower than the substantially circular central portion, at different angles in a three-dimensional space with respective centers thereof disposed closely to each other, imparting rotation to the disks to rotate about the centers thereof at an origin, and rendering the disks which are rotated.

With the above program, because the disks whose brightness is lower in the substantially ring-shaped portion than in the substantially circular central portion and which are rotated are rendered, the substantially circular central portion appears as a light sphere with light appearing therearound, and the brightness of the light can easily and realistically be expressed. The disks may be rotated at the. same speed, but should preferably be rotated at different speeds.

According to still another aspect of the present invention, there are also provided a recording medium which stores a program, and a program itself. The program comprises the steps of generating a plurality of disks, each comprising a substantially circular central portion and a substantially ring-shaped portion disposed around the substantially circular central portion and having a brightness lower than the substantially circular central portion, at different angles in a three-dimensional space with respective centers thereof disposed closely to each other, imparting rotation to the disks to rotate about the centers thereof at an origin, imparting fluctuation to the disks which are rotated, and rendering the disks which are rotated and fluctuated.

With the above program, an image of the light sphere which emits bright light can be fluctuated by the fluctuating means.

The above step of rendering the disks comprises the step of adding a rendered image of a new frame and a rendered image of a preceding image in semitransparently and rendering a sum image as a rendered image of a present frame. In this manner, the boundaries of the disks may be blurred.

The step of rendering the disks may comprise the step of placing a polygon onto which a texture of a lens flare is mapped between a viewpoint and the disks, and rendering the polygon and the disks. The bright light from the light sphere may thus be displayed more realistically.

The step of generating a plurality of disks may comprise the step of generating each of the disks by mapping a single texture image onto an object or combining a plurality of triangular polygons as the substantially circular central portion and a plurality of triangular polygons as the substantially ring-shaped portion.

With the above program, the substantially circular central portion of each of the disks may have a brightness gradually lower from the center radially outwardly toward the substantially ring-shaped portion, and the substantially ring-shaped portion has a brightness gradually lower from an inner peripheral edge thereof toward an outer peripheral edge thereof. Therefore, the light sphere and the bright light therefrom may be displayed more realistically.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
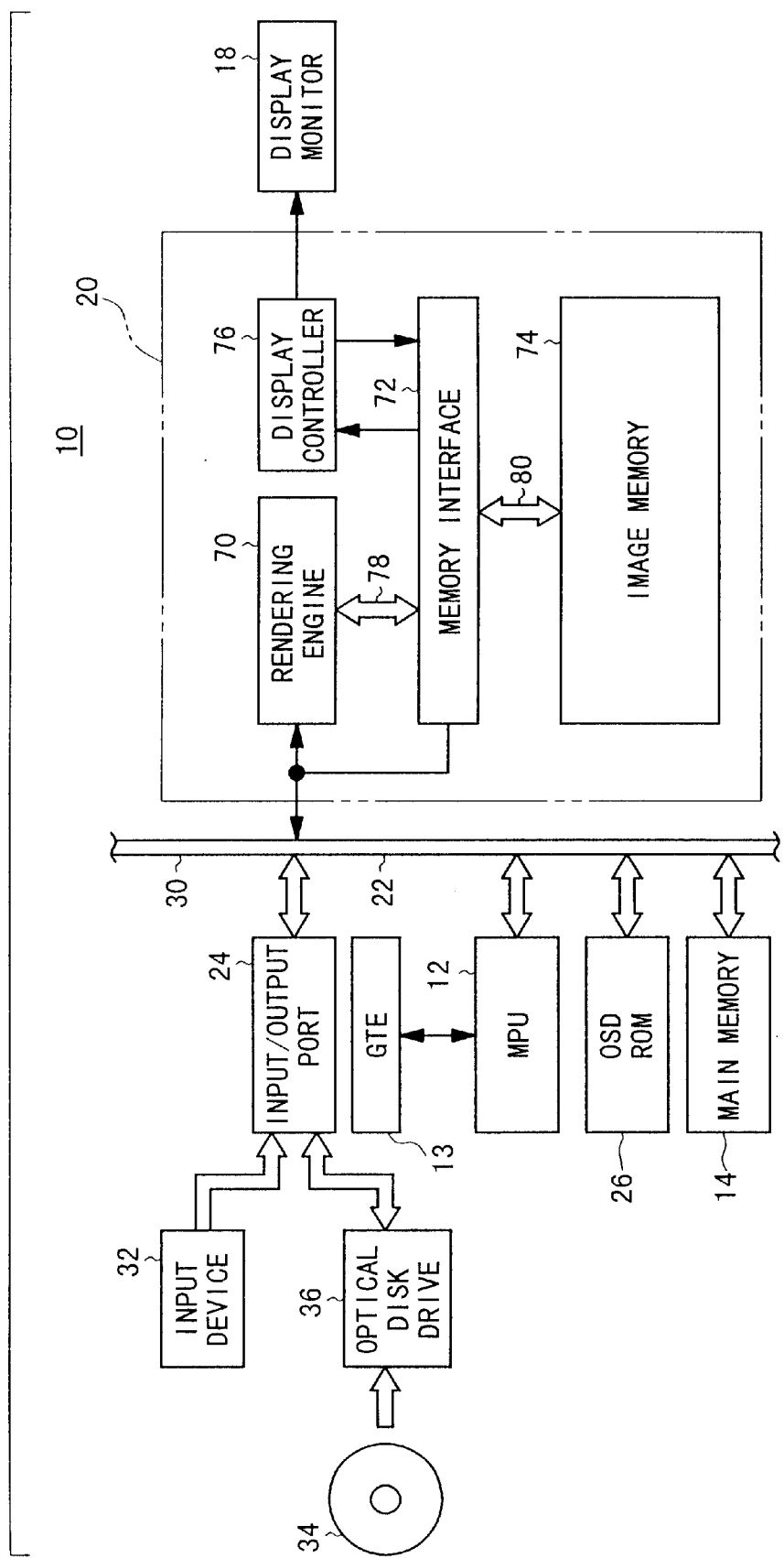
FIG. 1 is a block diagram of a general arrangement of an entertainment apparatus according to the present invention.

FIG. 1 shows an entertainment apparatus 10 for performing three-dimensional CG processing, to which the present invention is applied.

As shown in FIG. 1, the entertainment apparatus 10 comprises an MPU (MircoProcessing Unit) 12 for controlling the entertainment apparatus 10, a main memory 14 for storing various programs to be run and various data, an image processor for generating image data under the control of the MPU 12 and outputting the generated image data to a display monitor 18, e.g., a CRT, an input/output port 24 for sending data to and receiving data from external devices, and a ROM, i.e., OSDROM (On-Screen-Display Read-Only Memory), 26 with an OSD function, which may comprise a flash memory or the like, for controlling the kernel, etc.

The main memory 14, the OSDROM 26, and the input/output port 24 are connected to the MPU 12 via a bus 30. A GTE (Geometry Transfer Engine) 13 for performing coordinate. transforms (rotations and movements) including perspective projection transforms, light source calculations, vector operations, polygon coordinate operations, etc. at high speed is connected directly to the MPU 12.

The GTE 13 also has a function to divide a three-dimensional model to be displayed continuously as a moving image on the display monitor 18, into polygons or shaped facets according to calculation commands from the MPU 12.

To the input/output port 24, there are connected an input device 32 for inputting data (key input data, coordinate data, etc.) to the entertainment apparatus 10, and an optical disk drive 36 for playing back an optical disk 34 such as a CD-ROM, a DVD, or the like in which various programs and data (object-related data, texture data, etc.) are stored. The input device 32 may comprise a manual controller having direction buttons, etc.

The image processor 20 comprises a rendering engine 70, a memory interface 72, an image memory 74 as a storing means, and a display controller 76 such as a programmable CRT controller or the like.

The rendering engine 70 serves to render image data based on rendering commands and polygon coordinate data supplied from the CPU 12, and stores the rendered image data in the image memory 74 via the memory interface 72.

Specifically, the rendering engine 70 performs a texture mapping process by applying colors and shades, adding optical properties including mirror reflection, diffuse reflection, refraction, transparency, etc., adding surface patterns, and adding surrounding light, i.e., ambient light, to polygons (polygon coordinate data) which are shaped facets divided from a three-dimensional model that are calculated by the GTE 13 and supplied from the MPU 12.

A first bus 78 is connected between the memory interface 72 and the rendering engine 70, and a second bus 80 is connected between the memory interface 72 and the image memory 74. Each of the first and second buses 78, 80 has a 128-bit width, for example, for allowing the rendering engine 70 to render and store image data in the image memory 74 at a high speed.

The rendering engine 70 is capable of rendering image data of 320×240 pixels or image data of 640×480 pixels according to the NTSC or PAL system on a real-time fashion, i.e., more than ten times to several ten times in $1/60$ seconds to $1/30$ seconds.

The image memory 74 is of a unified memory structure that is able to designate texture rendering areas and display rendering areas in the same area.

The image controller 76 writes texture data read from the optical disk 34 and stored in the main memory 14 via the optical disk drive 36 or texture data read from the OSDROM 26 via the memory interface 72 into the texture rendering area of the image memory 74, and reads image data rendered in the display rendering area of the image memory 74 via the memory interface 72 and outputs the read image data to the display monitor 18 to display an image on its display screen.

Figure 2:
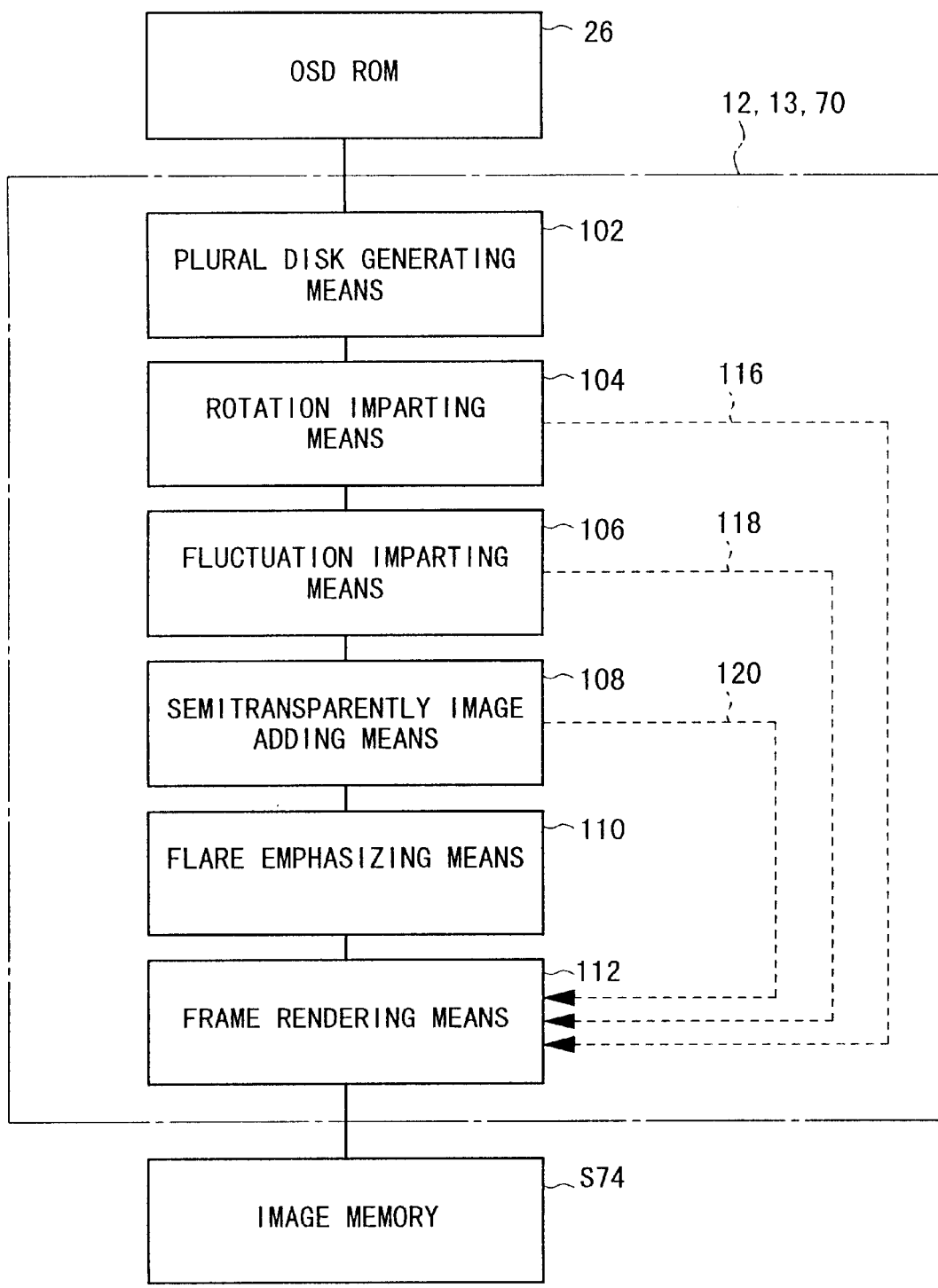
FIG. 2 is a functional block diagram of an image processing apparatus which is incorporated in the entertainment apparatus.

FIG. 2 shows in functional block form an image processing apparatus incorporated in the entertainment apparatus 10, or an image processing (three-dimensional CG processing) program, i.e., a function to simulate a light sphere and bright light (flare) appearing around the light sphere, performed by the rendering engine 70, which carries out a rendering process on a three-dimensional shape (3D model) based on rendering commands from the MPU 12, and the MPU 12 and the GET 13 which control the rendering engine 70.

The image processing program, which will be described below, is stored, together with three-dimensional model data and two-dimensional image data, in the OSDROM 26, and read and executed by the MPU 12. However, the image processing program, three-dimensional model data, and two-dimensional image data may be stored in the optical disk 34, read by the optical disk drive 36, loaded into the main memory 14, and read and executed by the MPU 12.

As shown in FIG. 2, the function to simulate the light sphere and the flare has a plural disk generating means 102 for reading various data relative to the display of the light sphere and the flare from the OSDROM 26 with the MPU 12, and generating a plurality of disks, which are brighter at their centers and darker at their peripheries, at different angles in a three-dimensional space with their centers being disposed closely to each other possibly at the origin, a rotation imparting means 104 for imparting rotation to the disks about their centers at the origin preferably at different speed or the same speed, a fluctuation imparting means 106 for imparting fluctuation such as a circular motion to the disks to which rotation has been imparted, a semitransparently image adding means 108 for adding a rendered image of a new frame and a rendered image of a preceding frame in semitransparently, a flare emphasizing means 110 for placing a polygon onto which the texture of a lens flare has been mapped, between a viewpoint and the disks to which the rendered images have been added semitransparently thereby to make the brightness of light more realistic, and a frame rendering means 112 for rendering the disks after the flare has been emphasized and storing the rendered disks in the image memory 74.

According to the function to simulate the light sphere and the flare as shown in FIG. 2, as indicated by a dotted-line path 116, the processing of the fluctuation imparting means 106, the semitransparently image adding means 108, and the flare emphasizing means 110 may be dispensed with, and a plurality of disks rotating about the same origin at different speeds, as represented by output data from the rotation imparting means 104, may be rendered and stored in the image memory 74 by the frame rendering means 112.

Alternatively, as indicated by a dotted-line path 118, the processing of the semitransparently image adding means 108 and the flare emphasizing means 110 may be dispensed with, and a plurality of disks rotating about the same origin at different speeds may be fluctuated, as represented by output data from the rotation imparting means 104 and the fluctuation imparting means 106, and thereafter the disks may be rendered and stored in the image memory 74 by the frame rendering means 112.

Further alternatively, as indicated by a dotted-line path 120, the processing of the flare emphasizing means 110 may be dispensed with, and a plurality of disks rotating about the same origin at different speeds may be fluctuated, as represented by output data from the rotation imparting means 104, the fluctuation imparting means 106, and the semitransparently image adding means 108, and thereafter the disks may be rendered and stored in the image memory 74 by the frame rendering means 112.

A processing sequence of the function to simulate the light sphere and the flare as shown in FIG. 2 will be described in detail below with reference to FIG. 3.

Figure 3:
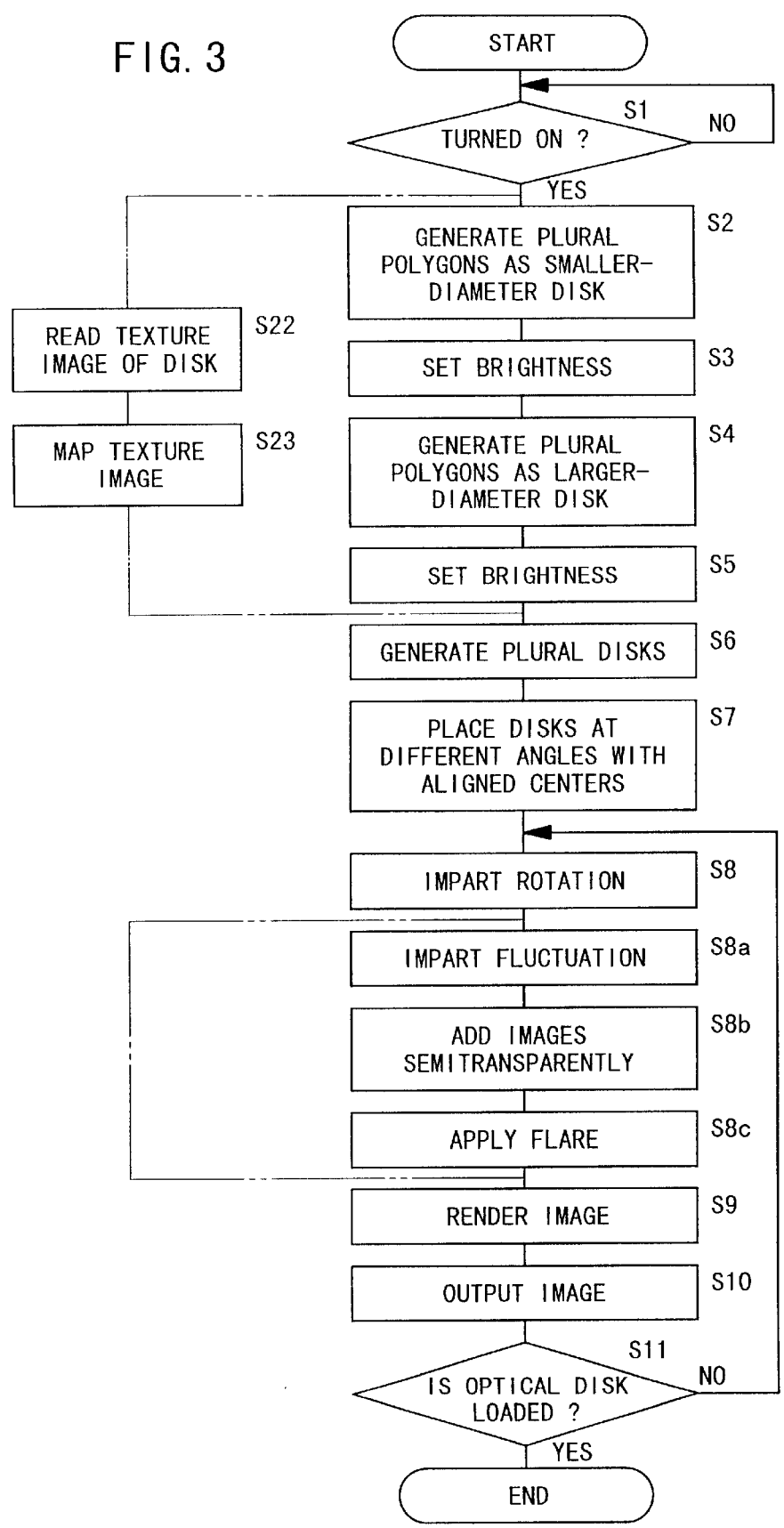
FIG. 3 is a flowchart of an operation sequence of the image processing apparatus.

In step S1 shown in FIG. 3, when the entertainment apparatus is turned on, the MPU 12 reads the image processing program from the OSDROM 26 and starts executing a display process relative to the function to simulate the light sphere and the flare.

The plural disk generating means 102 generates a plurality of disks in steps S2–S6 or in steps S22, 23.

Figure 4:
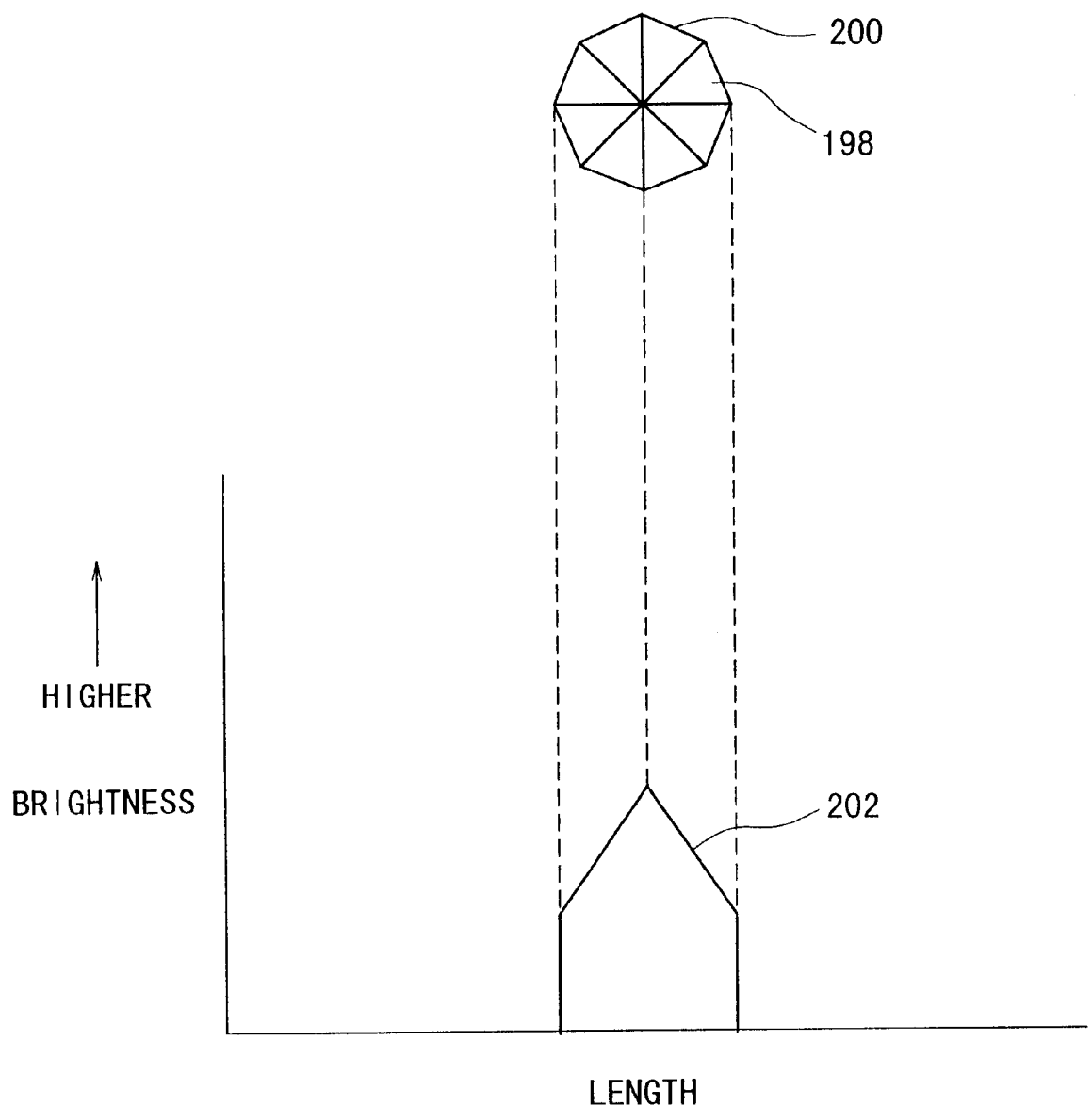
FIG. 4 is a diagram showing the relationship between a central smaller-diameter disk represented by triangular polygons and a brightness distribution thereof.

Specifically, in step S2, the plural disk generating means 102 prepares a plurality of triangular polygons 198 for use as a main light sphere portion, i.e., a central bright portion, in a circular pattern to generate a substantially circular central portion 200, i.e., generate a plurality of polygons 198 making up a smaller-diameter disk, as shown in an upper section of FIG. 4.

In step S3, as shown in a lower section of FIG. 4, the brightness of the substantially circular central portion 200 is set to a brightness distribution 202 in which the brightness is higher in a central region, i.e., the central region is brighter, and lower in a peripheral region, i.e., the peripheral region is darker.

Figure 5:
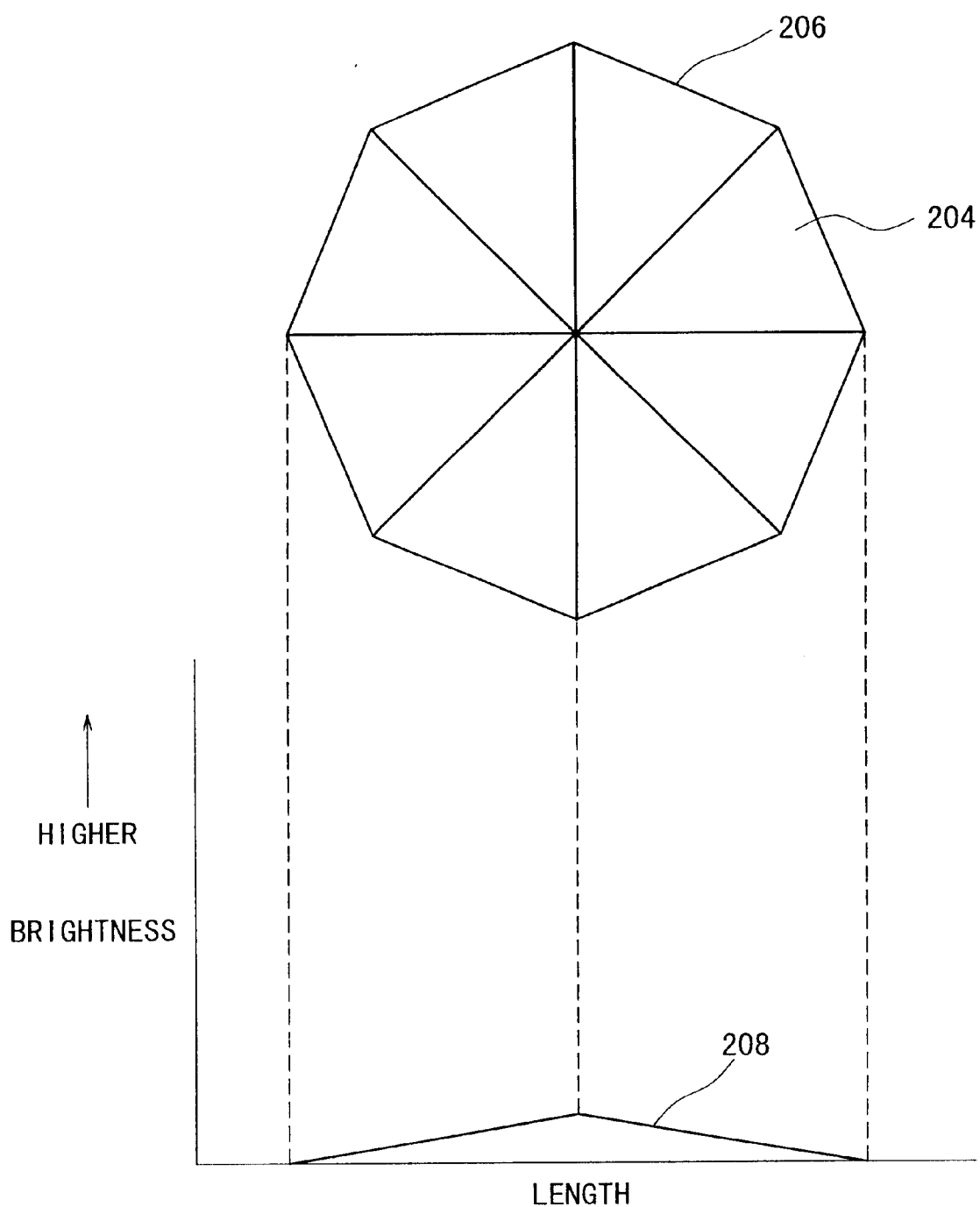
FIG. 5 is a diagram showing the relationship between a large-diameter disk represented by triangular polygons and a brightness distribution thereof.

In step S4, the plural disk generating means 102 prepares a plurality of triangular polygons 204 shown in an upper section of FIG. 5, which are larger than the triangular polygons 198 shown in FIG. 4, for use as a flare of a light sphere represented by the substantially circular central portion 200, in a circular pattern to generate a substantially circular peripheral portion 206 that is larger than the substantially circular central portion 200 by several diameters thereof, i.e., generate a plurality of polygons 204 making up a larger-diameter disk. The polygons 204 are generated in association with the respective polygons 198 of the substantially circular central portion 200.

In step S5, as shown in a lower section of FIG. 5, the brightness of the substantially circular peripheral portion 206 is set to a brightness distribution 208 in which the brightness is higher in a central region, i.e., the central region is brighter, and lower in a peripheral region, i.e., the peripheral region is darker. The maximum brightness (the brightness of the central region) of the brightness distribution 208 of the substantially circular peripheral portion 206 is considerably smaller than the minimum brightness (the brightness of the peripheral region) of the brightness distribution 202 of the substantially circular central portion 200 shown in FIG. 4.

In step S6, the plural disk generating means 102 gener25 ates a plurality of disks. As shown in an upper section of FIG. 6, each of the generated disks, denoted by 210, comprises the substantially circular central portion 200 shown in FIG. 4 and the substantially circular peripheral portion 206 shown in FIG. 5, which are integrally disposed coaxially on one plane. Each of the disks 210 has no thickness.

Figure 6:
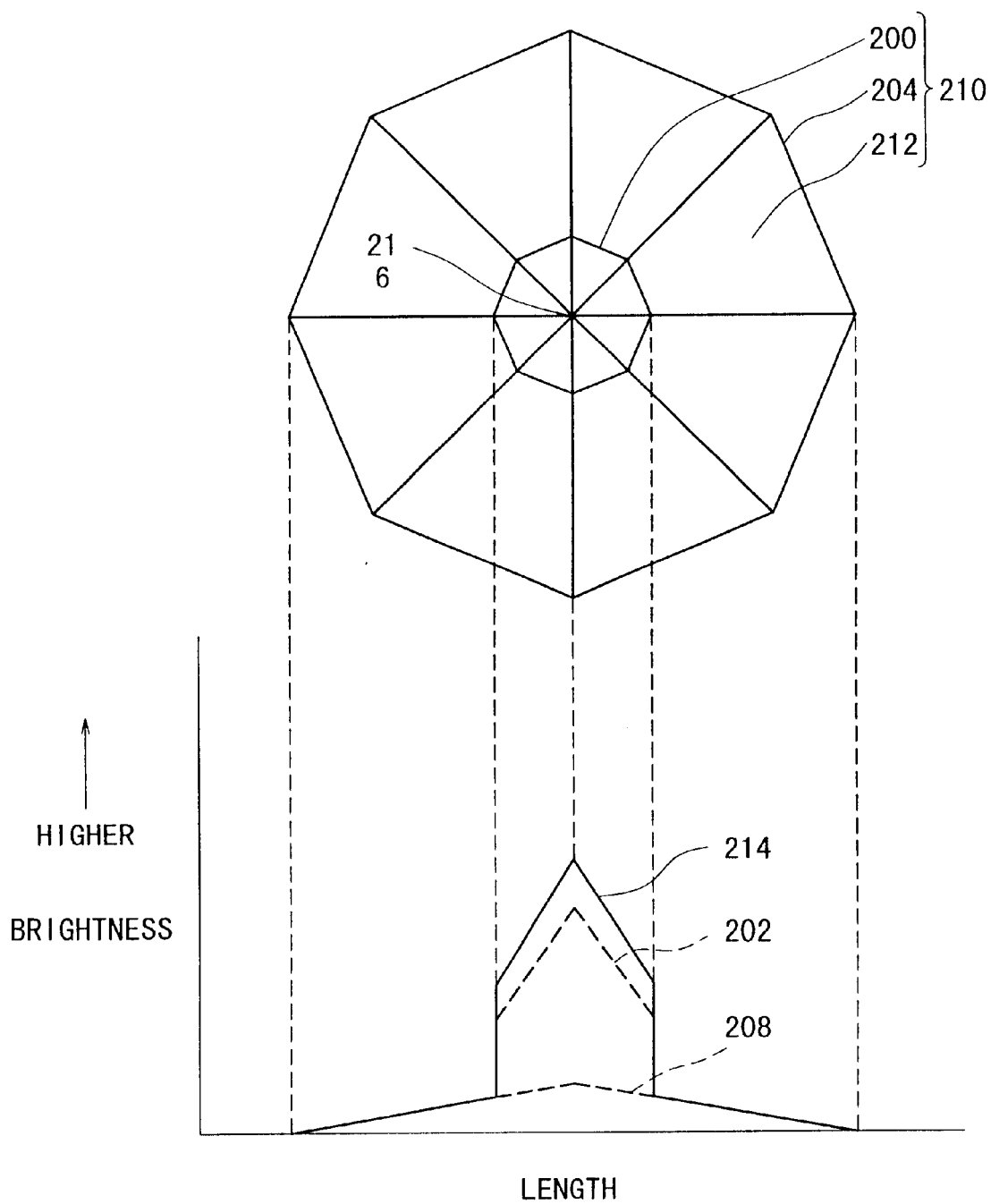
FIG. 6 is a diagram showing the relationship between a disk composed of the small- and large-diameter disks that are disposed on one plane and a brightness distribution thereof.

As shown in a lower section of FIG. 6, the brightness of each of the disks (also referred to as "dual disks") 210 is set to a brightness distribution 214 which is a combination of, i.e., the sum of, the brightness distribution 202 of the substantially circular central portion 200 and the brightness distribution 208 of the substantially circular peripheral portion 206. The brightness distribution 214 may be replaced with a brightness distribution that is produced by circularly interpolating the brightness distribution 214 in order to make smooth points where the derivative changes.

As can be seen from FIG. 6, the dual disk 210 may be considered as comprising the substantially circular central portion 200 and a substantially ring-shaped portion 212 disposed around the substantially circular central portion 200 and having a brightness lower than the brightness of the substantially circular central portion 200. The distribution of the substantially circular central portion 200 becomes gradually lower from its center 216 radially outwardly toward the substantially ring-shaped portion 212, and the substantially ring-shaped portion 212 has the brightness distribution 214, indicated by the solid-line curve, that the brightness of the substantially ring-shaped portion 212 becomes gradually lower from an inner peripheral edge toward an outer peripheral edge.

In step S6, the plural disk generating means 102 generates several disks 210, i.e., seven disks 210 in the present embodiment.

Figure 7:
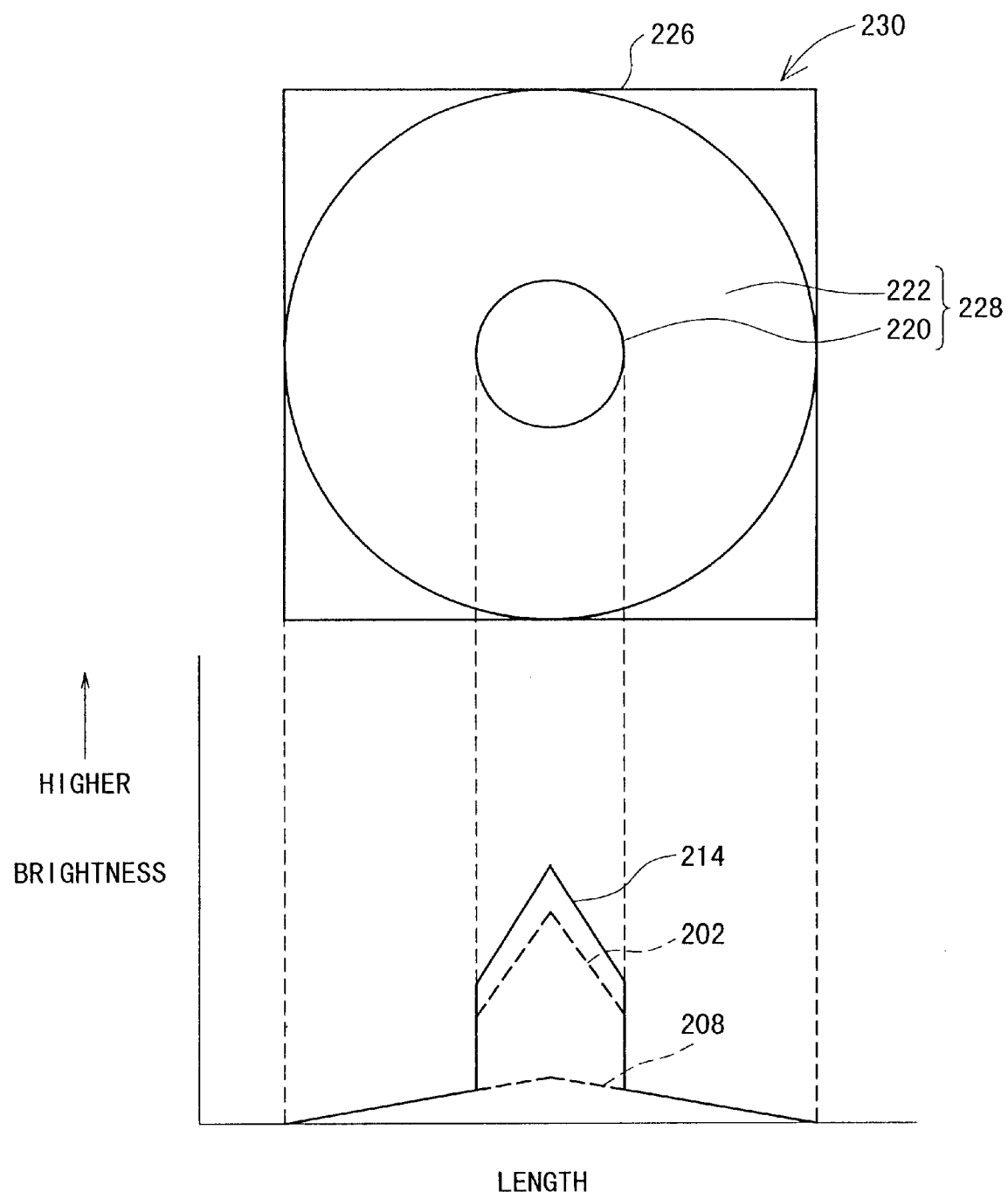
FIG. 7 is a diagram showing the relationship between a dual disk represented by a texture image and a brightness distribution thereof.

In steps S22, S23, a plurality of dual disks are generated according to another process. Specifically, as shown in FIG. 7, the plural disk generating means 102 prepares a single dual disk 230 by mapping a texture image of a disk 228, which comprises a circular or substantially circular central portion 220 and a ring-shaped or substantially ring-shaped portion 222 and has the same brightness distribution 214 as the disk 210, onto a square transparent object 226.

Figure 8:
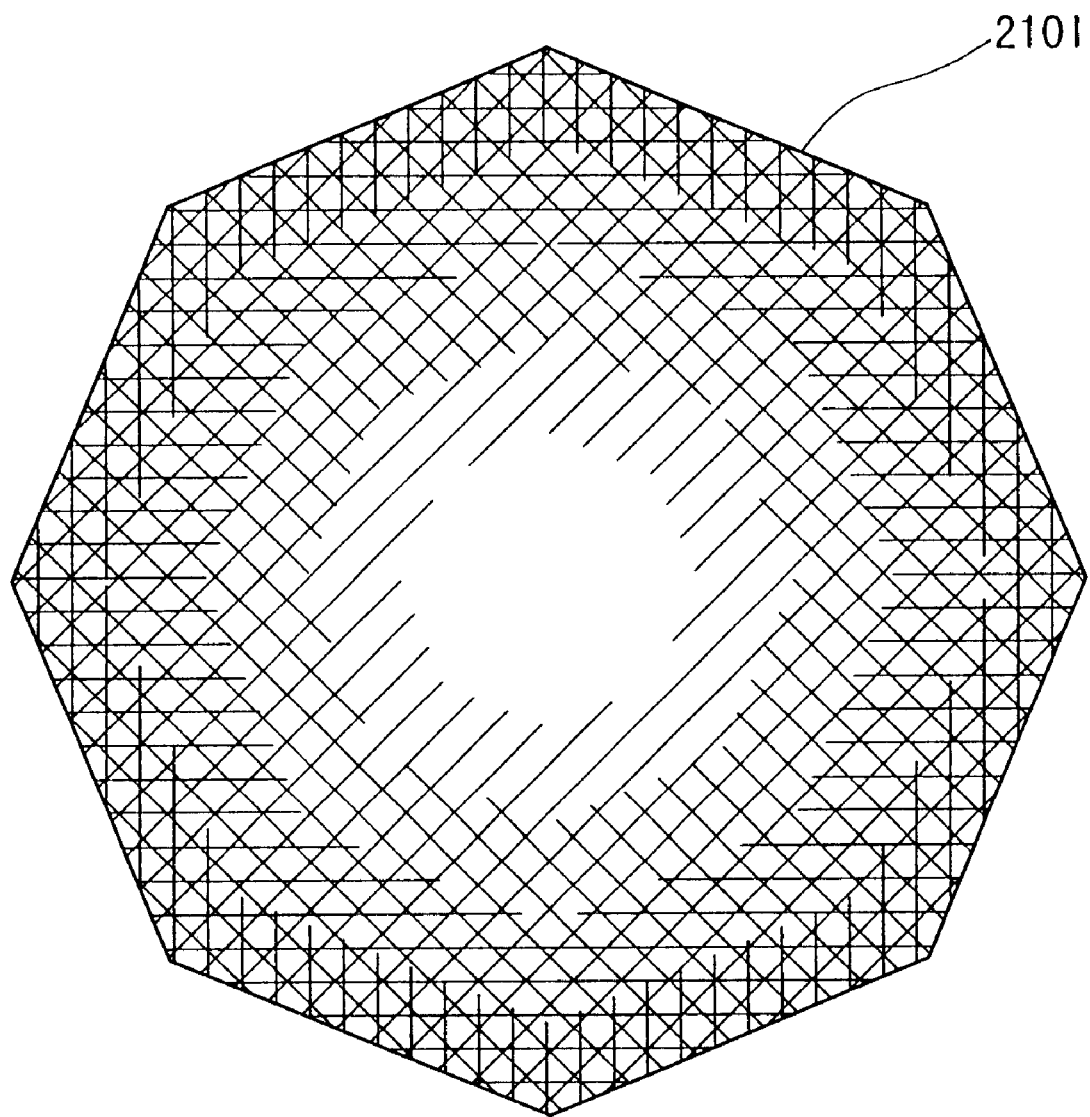
FIG. 8 is a diagram showing an image of a dual disk represented by triangular polygons.
Figure 9:
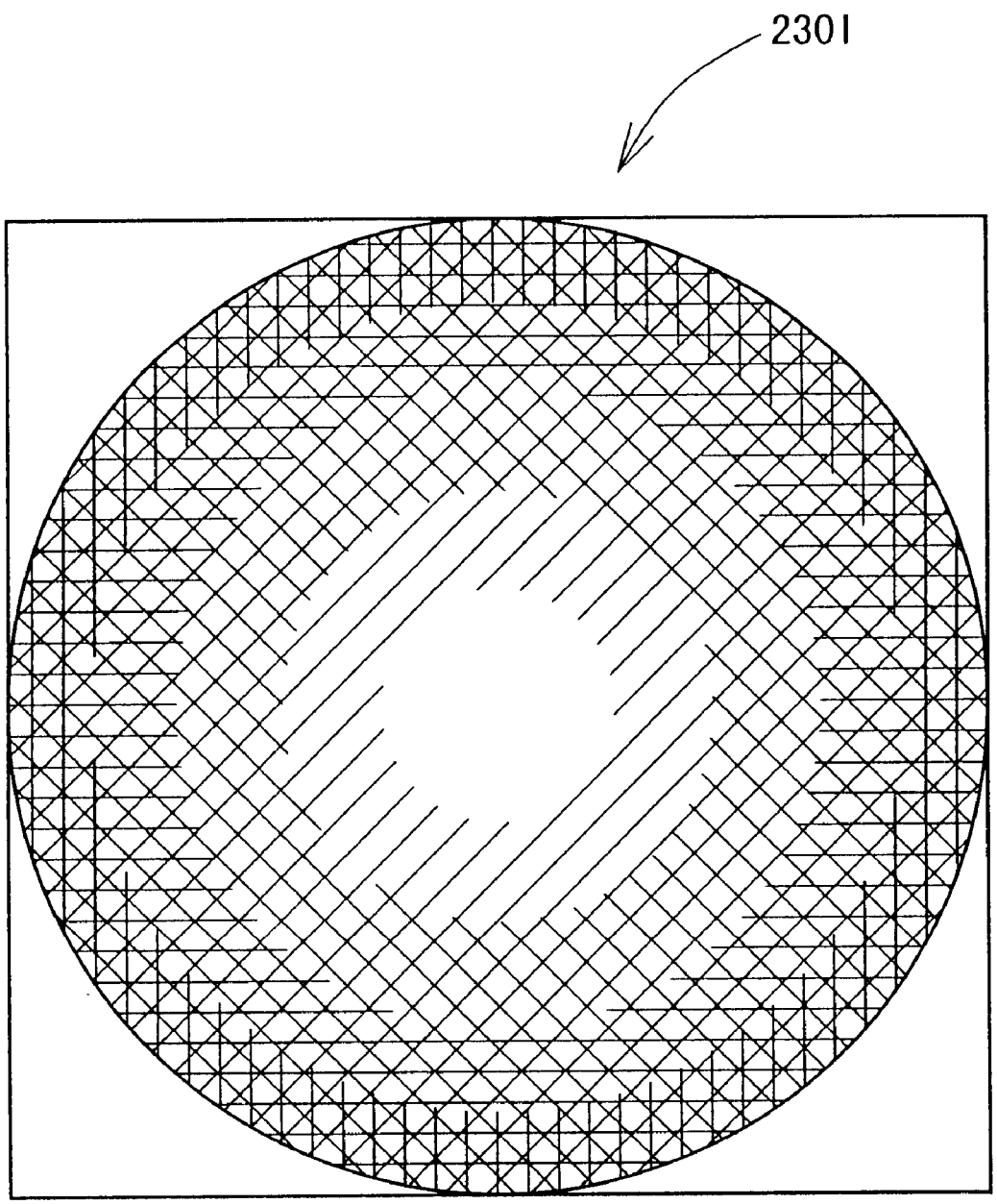
FIG. 9 is a diagram showing an image of a dual disk represented by a texture image.

FIG. 8 schematically shows an image 210I, which is visually perceived, of the disk 210 having the brightness distribution 214 shown in FIG. 6. FIG. 9 schematically shows an image 230I, which is visually perceived, of the disk 230 having the brightness distribution 214 shown in FIG. 7.

The disk 230 generated in the processing in steps S22, S23 will be referred to in the description below.

In step S7, the plural disk generating means 102 places the disks 230 at different angles such that the disks 230, each as a single object, have their centers aligned with each other or closely positioned but not aligned, and the disks 230 lie in respective planes which intersect each other at as large angles as possible in a three-dimensional space. For example, if there are three disks 230 and if the first disk 230 is placed in an XY plane with its center at the origin of a three-dimensional space, then the second disk 230 is placed in a YZ plane with its center at the origin of the three-dimensional space, and the third disk 230 is placed in a ZX plane with its center at the origin of the three-dimensional space. In this case, the viewpoint is located on the direction of a combination of unit vectors of three-dimensional coordinates XYZ.

In step S8, the rotation imparting means 104 imparts rotation to the disks 230 to rotate at different speeds or the same speed about their centers at the origin.

When the disks 230 are rotated at different speeds, the disks 230 can fluctuate light as seen from the viewpoint so as to make it brighter or darker depending on the orientation of the disks 230 from the viewpoint. The light can be fluctuated by the disks 230 more effectively if the speeds at which the disks 230 rotate are also fluctuated.

Figure 10:
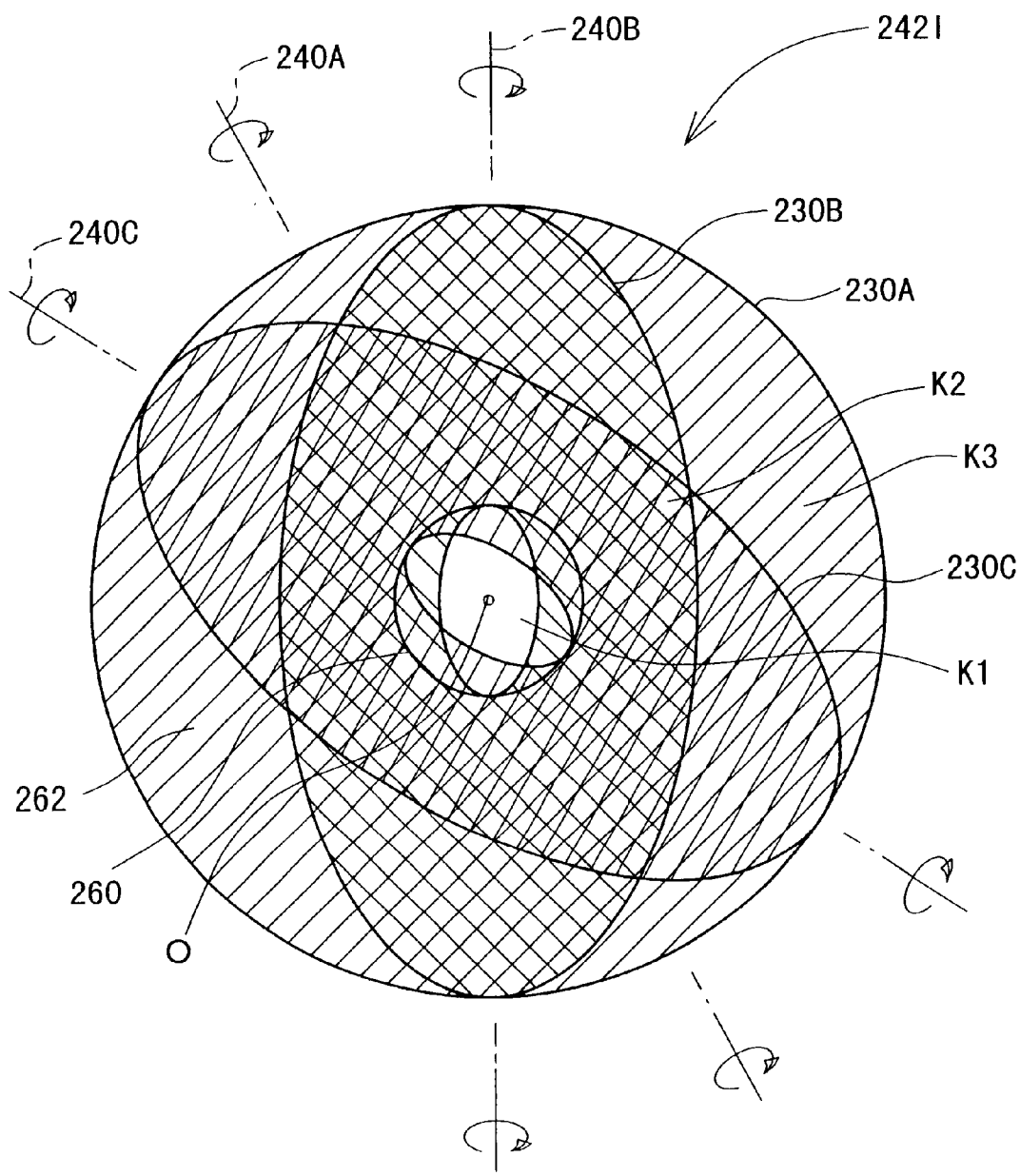
FIG. 10 is a diagram showing an image of three dual disks rotated about different axes, respectively.

FIG. 10 schematically shows an image 242I of three disks 230A, 230B, 230C having their centers at the same origin O and rotated about respective axes 240A, 240B, 240C which are not on the same plane but intersect each other at the origin O. In the image 242I, the brightnesses of the disks 230A, 230B, 230C are added to each other in an area where the disks 230A, 230B, 230C are superposed on each other. Therefore, areas where more of the disks 230A, 230B, 230C are superposed on each other are brighter. The image 242I is brightest in an area K1 around the origin O, and brighter in an area K2 than an area K3 where the disks 230A, 230B, 230C are not superposed on each other.

If a bypassing process indicated by the dotted-line path 116 shown in FIG. 2 is applied, then image data of the image 242I is stored in the image memory 74 in every 1/60 second by the frame rendering means 112 in step S9. In step S10, in every 1/60 second, the image data of a new image 242I is supplied from the image memory 74 via the memory interface 72 and the display controller 76 to the display monitor 18 to display the image 242I thereon.

In the image 242I displayed on the display monitor 18, a central portion 260 near the area K1 around the origin O appears as a light sphere that emits spherical light, and a ring-shaped portion 262 around the central portion 260 in the areas K2, K3 appears as a flare representing bright light.

Figure 11:
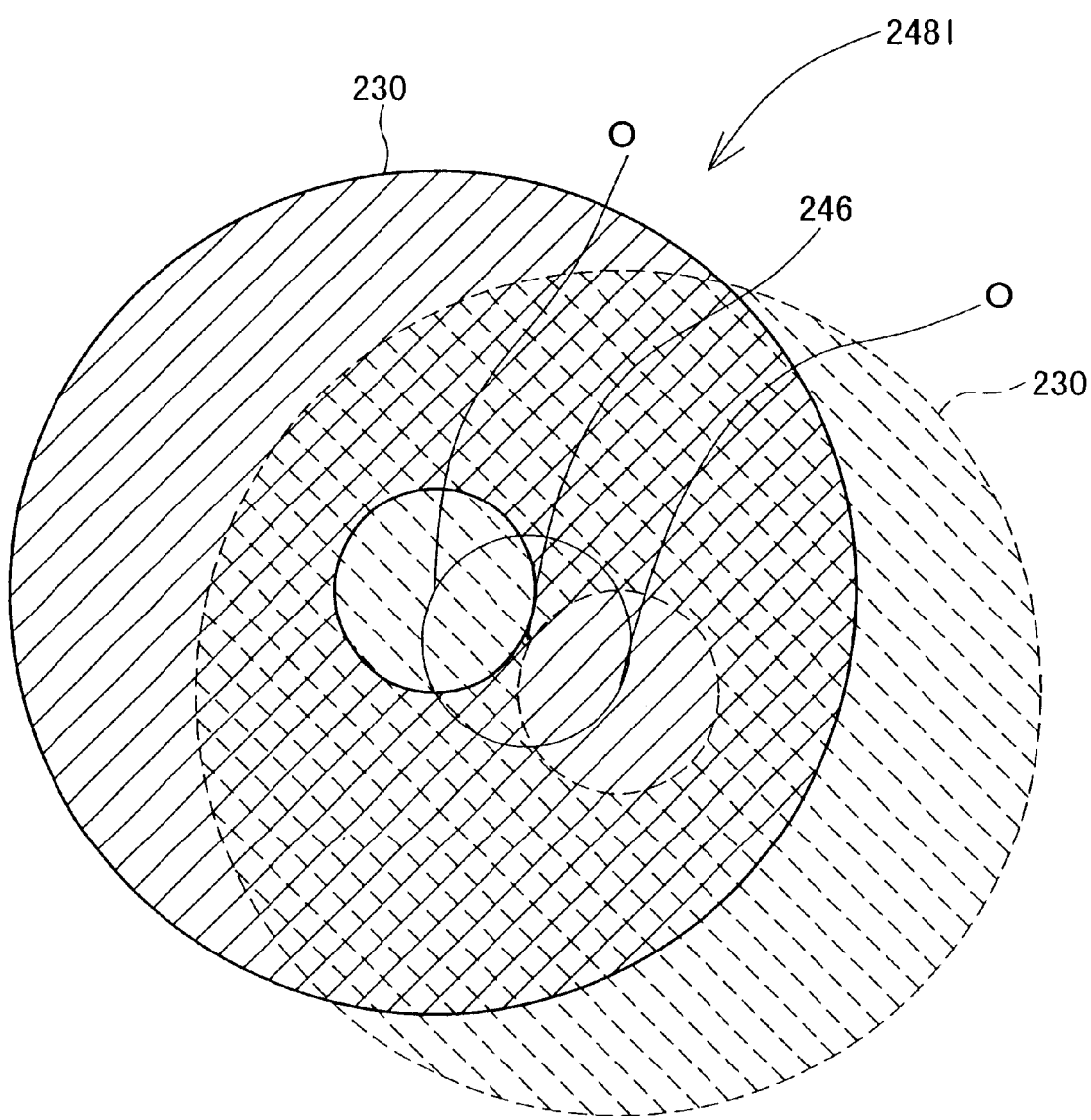
FIG. 11 is a diagram showing an image of a dual disk to which fluctuation is applied.

If fluctuation is to be imparted to light in order to express a viewpoint placed underwater, then the fluctuation imparting means 106 imparts constant-speed circular motion, for example, to cause the origin O about which the disks 230 rotate to rotate on a circle 246 at a constant speed, for example, as shown by an image 248I in FIG. 11.

With such constant-speed circular motion imparted, brightness irregularities are developed in the area where the disks 230 are superposed on each other, such that the light sphere in the central portion appears as fluctuating, and the flare in the peripheral portion also appears as fluctuating. In FIG. 11, the diameter of the circle 246 is shown as being substantially the same as the diameter of the central portion. However, the diameter of the circle 246 should preferably be smaller than the diameter of the central portion that appears as the light sphere.

The disks 230 may move on any of various desired shapes such as an elliptical shape, a triangular shape, etc., rather than the circular shape 246.

In step S8b, when an image of a new frame is generated after an image of a preceding frame has been stored in the image memory 74, the semitransparently image adding means 108 adds the image of the new frame and the image of the preceding frame to each other semitransparently, and uses the sum image as an image of a present frame thereby to apply an after image to the image of the present frame. For example, if the preceding frame has a pixel value a and the new frame has a pixel value b, and if a pixel value c of the present frame is to be obtained by adding 50% of the pixel value a and 50% of the pixel value b, then the pixel value c is calculated according to $c=(a+b)/2$.

Figure 12:
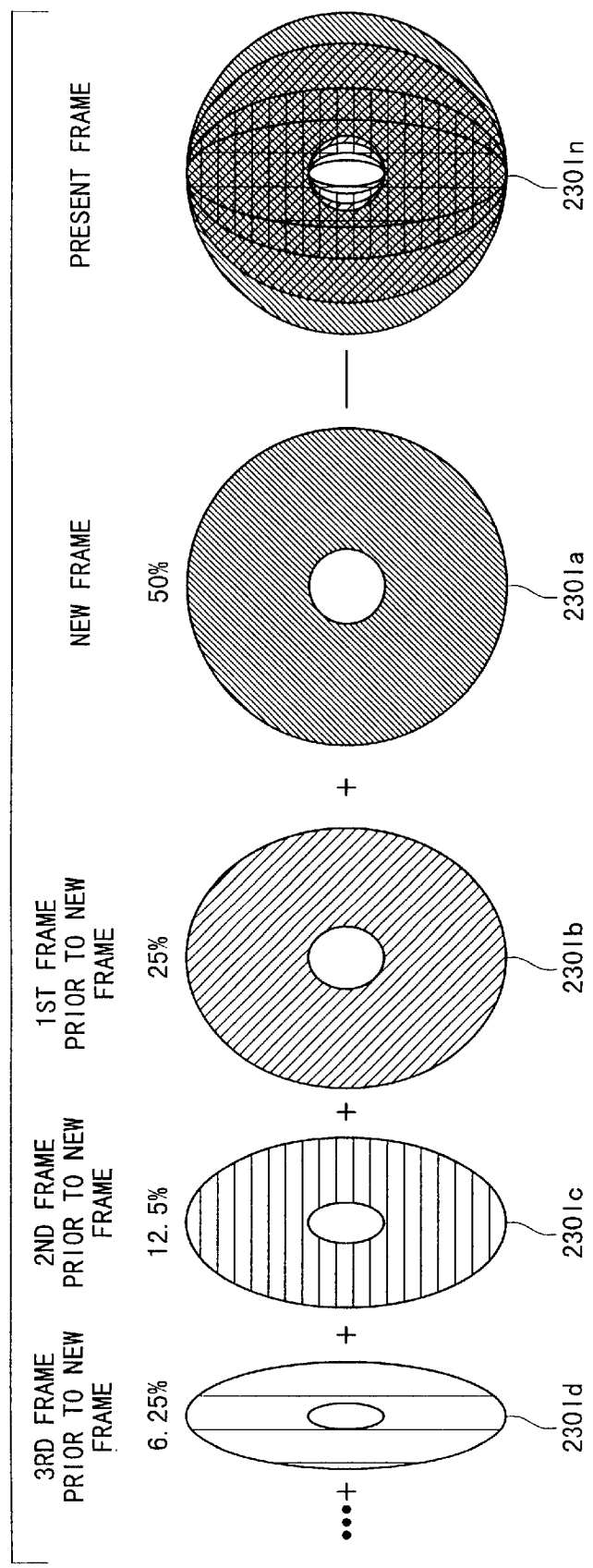
FIG. 12 is a diagram illustrative of a process of making a dual disk semitransparent when the dual disk is displayed.

For example, as shown FIG. 12, the brightness of an image age 230I$a$ of a new frame is used by 50%, the brightness of an image 230I$b$ of a first frame prior to the new frame is used by 25%, the brightness of an image 230I$c$ of a second frame prior to the new frame is used by 12.5%, and the brightness of an image 230I$d$ of a third frame prior to the new frame is used by 6.25%. In this manner, the brightness of an image is reduced to one half each time a preceding frame is used. An image 230I$n$ of a present frame is produced by adding the images 230I$a$, 230I$b$, 230I$c$, 230I$d$, . . . .

By thus applying an after image to the image of the present frame, boundaries of the polygons of the image of the present frame are prevented from being clearly shown.

Figure 13:
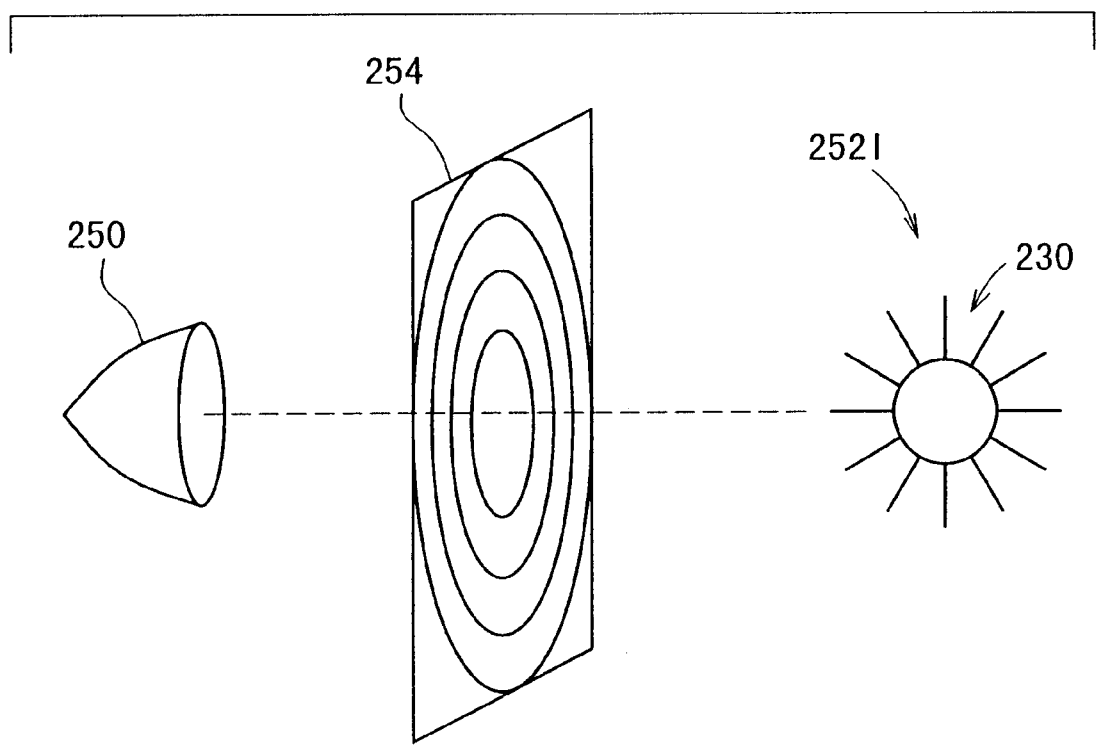
FIG. 13 is a view showing a texture of a lens flare disposed between a viewpoint and a plurality of rotating dual disks.

In step S8c, the flare emphasizing means 110 places a polygon on which a texture 254 of a lens flare has been mapped between a viewpoint 250 and an image 252I, as shown in FIG. 13. The image 252I is made up of a central light sphere comprising a plurality of disks 230 which have been disposed at different angles in a three-dimensional space by the plural disk generating means 102, rotated at different speeds by the rotation imparting means 104, fluctuated at the center by the fluctuation imparting means 106, and added semitransparently by the semitransparently image adding means 108, and a ring-shaped portion as a flare representing bright light of the light sphere. In step S9, image data of the image 252I and the polygon shown in FIG. 13 is stored in the image memory 74. In step S10, the image data of the image 252I is supplied from the image memory 74 via the memory interface 72 and the display controller 76 to the display monitor 18 to display the image 252I of the light sphere with the flare highly realistically thereon.

If the optical disk 34 loaded by the user is detected by the optical disk drive 36 in step S11, then the display of the image 252I of the light sphere with the flare is finished. The program stored in the OSDROM 26 from step S1 to step S10 is now ended, after which the program stored in the optical disk 34 starts being executed.

According to the present invention, as described above, a plurality of disks each comprising a substantially circular central portion and a substantially ring-shaped portion disposed around the substantially circular central portion and having a brightness lower than the substantially circular central portion are placed at different angles in a three-dimensional space and rotated about their centers that are disposed closely to each other. Image data of those disks are stored in the image memory.

The substantially circular central portions of the disks represent a light sphere, and the substantially ring-shaped portions thereof represent a flare of bright light appearing around the light sphere.

In this manner, the light sphere and the bright light appearing around the light sphere can be expressed easily and realistically.

Although certain preferred embodiments of the present invention have been shown and described in detail, it should be understood that various changes and modifications may be made therein without departing from the scope of the appended claims.

What is claimed is:

1. An image processing apparatus, comprising:
   means for generating a plurality of digital disk models, each digital disk model comprising a substantially circular central portion and a substantially ring-shaped portion disposed around said substantially circular central portion and having a brightness lower than said substantially circular central portion, each of said plurality of digital disk models being at different angles in a three-dimensional space with respectively centers thereof disposed closely to each other;
   means for imparting rotation to said plurality of digital disk models about the respective centers thereof;
   means for rendering an image of said plurality of digital disk models which are rotated; and
   means for storing the rendered image.

2. An image processing apparatus according to claim 1, wherein said rendering means adds a rendered image of a new frame and a rendered image of a preceding image semitransparently to create a sum image, and renders the sum image as a rendered image of a present frame.

3. An image processing apparatus according to claim 1, wherein said rendering means places a polygon, on which a texture of a lens flare is mapped, between a viewpoint and said plurality of digital disk models, and renders the polygon and said plurality of digital disk models for storage in said storing means.

4. An image processing apparatus according to claim 1, wherein for at least one of said plurality of disk models said generating means combines a plurality of triangular polygons as said substantially circular central portion and a plurality of triangular polygons as said substantially ring-shaped portion.

5. An image processing apparatus according to claim 1, wherein said substantially circular central portion of each of said plurality of digital disk models has a brightness which gradually decreases from a center of said substantially circular central portion radially outwardly, and said substantially ring-shaped portion has a brightness which gradually decreases from an inner peripheral edge thereof toward an outer peripheral edge thereof.

6. An image processing apparatus according to claim 1, wherein for at least one of said plurality of digital disk models said generating means maps a single texture image onto an object for creating said substantially circular central portion and said substantially ring-shaped portion.

7. An image processing apparatus, comprising:
   means for generating a plurality of digital disk models, each digital disk model comprising a substantially circular central portion and a substantially ring-shaped portion disposed around said substantially circular central portion and having a brightness lower than said substantially circular central portion, each of said plurality of digital disk models being at different angles in a three-dimensional space with respective centers thereof disposed closely to each other;
   means for imparting rotation to said plurality of digital disk models to rotate about the respective centers thereof;
   means for moving at least one of said plurality of digital disk models around a circle;
   means for rendering an image of said plurality of digital disk models which are rotated; and
   means for storing the rendered image.

8. A computer-readable medium having stored thereon computer-executable instructions which when executed perform a graphics method, the method comprising:
   generating a plurality of digital disk models, each digital disk model comprising a substantially circular central portion and a substantially ring-shaped portion disposed around said substantially circular central portion and having a brightness lower than said substantially circular central portion, each of said plurality of digital disk models being at different angles in a three-dimensional space with respective centers thereof disposed closely to each other;
   imparting rotation to said plurality of digital disk models to rotate about the respective centers thereof; and
   rendering an image of said plurality of digital disk models which are rotated.

9. A recording medium according to claim 8, wherein said step of rendering an image includes:
   adding a rendered image of a new frame and a rendered image of a preceding image semitransparently to create a sum image; and
   rendering the sum image as a rendered image of a present frame.

10. A recording medium according to claim 8, wherein said step of rendering an image includes:
    placing a polygon, on which a texture of a lens flare is mapped, between a viewpoint and said plurality of digital disk models; and rendering the polygon and said plurality of digital disk models.

11. A recording medium according to claim 8, wherein for at least one of said plurality of disk models said step of generating a plurality of digital disk models includes:
   combining a plurality of triangular polygons as said substantially circular central portion; and
   combining a plurality of triangular polygons as said substantially ring-shaped portion.

12. A recording medium according to claim 8, wherein said substantially circular central portion of each of said plurality of digital disk models has a brightness which gradually decreases from a center of said substantially circular central portion radially outwardly, and said substantially ring-shaped portion has a brightness which gradually decreases from an inner peripheral edge thereof toward an outer peripheral edge thereof.

13. The method according to claim 8, wherein for at least one of said plurality of digital disk models said step of generating a plurality of digital disk models includes:
   mapping a single texture image onto an object for creating said substantially circular central portion and said substantially ring-shaped portion.

14. A computer-readable medium having stored thereon computer-executable instructions which when executed perform a graphics method, the method comprising:
   generating a plurality of digital disk models, each digital disk model comprising a substantially circular central portion and a substantially ring-shaped portion disposed around said substantially circular central portion and having a brightness lower than said substantially circular central portion, each of said plurality of digital disk models being at different angles in a three-dimensional space with respective centers thereof disposed closely to each other;
   imparting rotation to said plurality of digital disk models about the respective centers thereof;
   moving at least one of said plurality of digital disk models around a circle; and
   rendering an image of said plurality of digital disk models which are rotated.

15. A method, comprising:
   generating a plurality of digital disk models, each digital disk model comprising a substantially circular central portion and a substantially ring-shaped portion disposed around said substantially circular central portion and having a brightness lower than said substantially circular central portion, each of said plurality of digital disk models being at different angles in a three-dimensional space with respective centers thereof disposed closely to each other;
   imparting rotation to said plurality of digital disk models about the respective centers thereof; and
   rendering an image of said plurality of digital disk models which are rotated.

16. The method according to claim 15, wherein said step of rendering an image includes:
   adding a rendered image of a new frame and a rendered image of a preceding image semitransparently to create a sum image; and
   rendering the sum image as a rendered image of a present frame.

17. The method according to claim 15, wherein said step of rendering an image includes:
   placing a polygon, on which a texture of a lens flare is mapped, between a viewpoint and said plurality of digital disk models; and
   rendering the polygon and said plurality of digital disk models.

18. The method according to claim 15, wherein for at least one of said plurality of disk models said step of generating a plurality of digital disk models includes:
   combining a plurality of triangular polygons as said substantially circular central portion; and
   combining a plurality of triangular polygons as said substantially ring-shaped portion.

19. The method according to claim 15, wherein said substantially circular central portion of each of said plurality of digital disk models has a brightness which gradually decreases from a center of said substantially circular central portion radially outwardly, and said substantially ring-shaped portion has a brightness which gradually decreases from an inner peripheral edge thereof toward an outer peripheral edge thereof.

20. The method according to claim 15, wherein for at least one of said plurality of digital disk models said step of generating a plurality of digital disk models:
   mapping a single texture image onto an object for creating said substantially circular central portion and said substantially ring-shaped portion.

21. A method, comprising:
   generating a plurality of digital disk models, each digital disk model comprising a substantially circular central portion and a substantially ring-shaped portion disposed around said substantially circular central portion and having a brightness lower than said substantially circular central portion, each of said plurality of digital disk models being at different angles in a three-dimensional space with respective centers thereof disposed closely to each other;
   imparting rotation to said plurality of digital disk models about the respective centers thereof;
   moving at least one of said plurality of disk models around a circle; and
   rendering an image of said plurality of digital disk models which are rotated.

22. Apparatus, comprising:
   a rendering engine for (a) imparting rotation to a plurality of digital disk models about respective centers thereof, and (b) rendering an image of said plurality of digital disk models which are rotated;
   a memory for storing the rendered image; and
   a display controller for displaying the rendered image;
   wherein each of said plurality of digital disk models comprises a substantially circular central portion and a substantially ring-shaped portion disposed around said substantially circular central portion and having a brightness lower than said substantially circular central portion, each of said plurality of digital disk models being at different angles in a three-dimensional space with respective centers thereof disposed closely to each other.

23. The apparatus according to claim 22, wherein said rendering engine adds a rendered image of a new frame and a rendered image of a preceding image semitransparently to create a sum image, and renders the sum image as a rendered image of a present frame.

24. The apparatus according to claim 22, wherein said rendering engine places a polygon, on which a texture of a lens flare is mapped, between a viewpoint and said plurality of digital disk models, and renders the polygon and said plurality of digital disk models for storage in said memory.

25. The apparatus according to claim 22, wherein at least one of said plurality of disk models is created by combining a plurality of triangular polygons as said substantially circular central portion and a plurality of triangular polygons as said substantially ring-shaped portion.

26. The apparatus according to claim 22, wherein at least one of said plurality of digital disk models is created by mapping a single texture image onto an object to create said substantially circular central portion and said substantially ring-shaped portion.

27. The apparatus according to claim 22, wherein said, substantially circular central portion of each of said plurality of digital disk models has a brightness which gradually decreases from a center of the substantially circular central portion radially outwardly, and said substantially ring-shaped portion has a brightness which gradually decreases from an inner peripheral edge thereof toward an outer peripheral edge thereof.

* * * * *

UNITED STATES PATENT AND TRADEMARK OFFICE
CERTIFICATE OF CORRECTION

PATENT NO.    : 6,559,847 B1
DATED         : May 6, 2003
INVENTOR(S)   : Seki

It is certified that error appears in the above-identified patent and that said Letters Patent is hereby corrected as shown below:

Column 3,
Line 46, cancel "ft".

Column 4,
Line 1, after "processor" insert -- 20 --.

Column 6,
Line 51, cancel "25" and insert a hyphen in its place.

Column 7,
Line 6, cancel "20" and insert a hyphen in its place.

Column 14,
Line 1, cancel "," after the word "said".

Signed and Sealed this

Thirtieth Day of September, 2003

JAMES E. ROGAN
*Director of the United States Patent and Trademark Office*